United States Patent
Koike

(10) Patent No.: US 7,927,050 B2
(45) Date of Patent: Apr. 19, 2011

(54) INTERIOR PART MOUNTING CLIP

(75) Inventor: Takashi Koike, Kanagawa (JP)

(73) Assignee: Piolax Inc., Yokohama-shi, Kanagawa (JP)

(*) Notice: Subject to any disclaimer, the term of this patent is extended or adjusted under 35 U.S.C. 154(b) by 906 days.

(21) Appl. No.: 11/806,269

(22) Filed: May 30, 2007

(65) Prior Publication Data

US 2008/0298890 A1    Dec. 4, 2008

(51) Int. Cl.
*F16B 37/00* (2006.01)

(52) U.S. Cl. .......................... 411/104; 411/188; 411/508

(58) Field of Classification Search .................. 411/104, 411/508, 913, 111, 188
See application file for complete search history.

(56) References Cited

U.S. PATENT DOCUMENTS

| | | | |
|---|---|---|---|
| 4,505,611 A | 3/1985 | Nagashima et al. | |
| 4,810,147 A | 3/1989 | Hirohata | |
| 4,867,599 A | 9/1989 | Sasajima | |
| 5,038,444 A | 8/1991 | Gordon | |
| 5,106,223 A | 4/1992 | Kraus | |
| 5,297,322 A | 3/1994 | Kraus | |
| 5,507,610 A | 4/1996 | Benedetti et al. | |
| 5,651,634 A | 7/1997 | Kraus | |
| 5,855,461 A * | 1/1999 | Tripi | 411/182 |
| 6,039,523 A * | 3/2000 | Kraus | 411/48 |
| 6,287,043 B1 * | 9/2001 | Kraus | 403/297 |
| 6,572,317 B2 * | 6/2003 | Okada et al. | 411/508 |
| 7,481,474 B2 * | 1/2009 | Higgins et al. | 296/1.08 |
| 7,698,787 B2 * | 4/2010 | Scroggie et al. | 24/297 |
| 2004/0016088 A1 * | 1/2004 | Angellotti | 24/297 |
| 2006/0000064 A1 * | 1/2006 | Leverger et al. | 24/297 |
| 2007/0098523 A1 * | 5/2007 | Klein | 411/508 |
| 2007/0166127 A1 * | 7/2007 | Scroggie et al. | 411/508 |

FOREIGN PATENT DOCUMENTS

| | | |
|---|---|---|
| JP | 56-12109 | 2/1981 |
| JP | 58-130108 | 9/1983 |
| JP | 59-4805 | 1/1984 |
| JP | 62-44120 | 3/1987 |
| JP | 62-137158 | 8/1987 |
| JP | 8-296616 | 11/1996 |

OTHER PUBLICATIONS

Japanese Office Action dated Dec. 1, 2009 and English translation thereof.
Japanese Office Action dated Mar. 16, 2010 with English-language translation.

* cited by examiner

*Primary Examiner* — Shane Bomar
*Assistant Examiner* — Roberta Delisle
(74) *Attorney, Agent, or Firm* — McGinn IP Law, PLLC

(57) ABSTRACT

According to one embodiment of the invention, there is provided an interior part mounting clip for mounting an interior part on a panel member including: a pin portion having a smaller external diameter than the internal diameter of a mounting hole formed in a frame-shaped mounting seat formed on the interior part and inserted into and made movable in the mounting hole; a head portion formed at one end of the pin portion and engaging with the mounting seat; and a stem portion formed at the other end of the pin portion and engaging with an engaging hole formed in the panel member. The head portion includes at least three protrusions protruding radially outward of the pin portion, and an outer frame mounted in a manner to be elastically displaced relative to the pin portion through a plurality of elastic portions extending radially outward from the portions of the pin portion between the protrusions. The outer circumference of the outer frame abuts against the inner circumference of the frame-shaped mounting seat and engages with the circumferential edge of the mounting hole.

10 Claims, 8 Drawing Sheets

INTERIOR PART MOUNTING CLIP

BACKGROUND

1. Field of the Invention

The present invention relates to an interior part mounting clip for mounting an interior part in an automobile, on a panel member such as a body panel.

2. Description of the Related Art

As the clip for mounting an interior part such as a door trim on the body panel of an automobile, for example, a clip is disclosed in U.S. Pat. No. 5,651,634. The interior part is provided in the interior part with a mounting seat, which has an upper pocket and a lower pocket in a frame shape. The clip disclosed includes a pin portion, an engaging leg for engaging with a panel member, an upper flange to be inserted into the upper pocket, and a lower flange to be inserted into the lower pocket. The upper flange has an annular outer ring, and an elastically deformable arm formed in a spiral shape from the pin portion and connected to the outer ring.

At the mounting time, the interior part is mounted on the panel member by bringing the clip into engagement with the interior part and by bringing the engaging leg into the engaging hole of the panel member. Even if the clip mounted on the interior part is then deviated from the position of the engaging hole of the panel member, the arm can be elastically deformed to absorb the positional displacement so that the interior part can be mounted on the body panel.

SUMMARY

In the aforementioned clip, the lower flange engages with the lower pocket thereby to keep the engaging state between the clip and the interior part. According to this structure, however, the mounting seat has to be equipped with the upper pocket and the lower pocket, and the clip has to be equipped with the upper flange and the lower flange. As a result, the structure is complicated to increase the thickness in the vertical direction thereby to make the interior part bulky. The present invention has been made in view of the above circumstances.

According to an aspect of the invention, there is provided an interior part mounting clip, which can mount an interior part reliably on a panel member even if the engaging hole of a panel member and the mounting seat of the interior part are deviated, and which has a simple and compact structure.

According to another aspect of the invention, there is provided an interior part mounting clip to be inserted into a frame-shaped mounting seat disposed in an interior part, for mounting an interior part on a panel member, comprising: a pin portion having a smaller external diameter than the internal diameter of a mounting hole formed in a frame-shaped mounting seat formed on the interior part and inserted into and made movable in the mounting hole; a head portion formed at one end of the pin portion and engaging with the mounting seat; and a stem portion formed at the other end of the pin portion and engaging with an engaging hole formed in the panel member, wherein the head portion includes at least three protrusions protruding radially outward of the pin portion, and an outer frame mounted in a manner to be elastically displaced relative to the pin portion through a plurality of elastic portions extending radially outward from the portions of the pin portion between the protrusions, and wherein the outer circumference of the outer frame abuts against the inner circumference of the frame-shaped mounting seat and engages with the circumferential edge of the mounting hole.

According to another aspect of the invention, the protrusions and the elastic portions are protruded radially outward through a head flange portion protruding radially outward of the pin portion.

According to another aspect of the invention, the elastic portions are so formed that the height of the side to face the interior part at the time of engagement with the mounting seat is smaller than that of the head flange portion and the outer frame.

According to another aspect of the invention, the protrusions are so formed that the height of the side to face of the interior part at the time of engagement with the mounting seat is smaller than that of the head flange portion.

According to another aspect of the invention, the protrusion length L of the protrusions radially outward from outer circumference of the pin portion in the state where the head portion engages with the mounting seat is so set as is expressed by L=A−B+C, if the internal diameter of the mounting hole of the mounting seat is designated by A, if the external diameter of the pin portion is designated by B, and if the length of the engaging portions, as required for the protrusions to engage with the mounting hole, is designated by C.

BRIEF DESCRIPTION OF THE DRAWINGS

These and other objects and advantages of this invention will become more fully apparent from the following detailed description taken with the accompanying drawings, in which.

DESCRIPTION OF THE EMBODIMENTS

One embodiment of the invention of the interior part mounting clip is described in the following with reference to the accompanying drawings.

Figure 1:
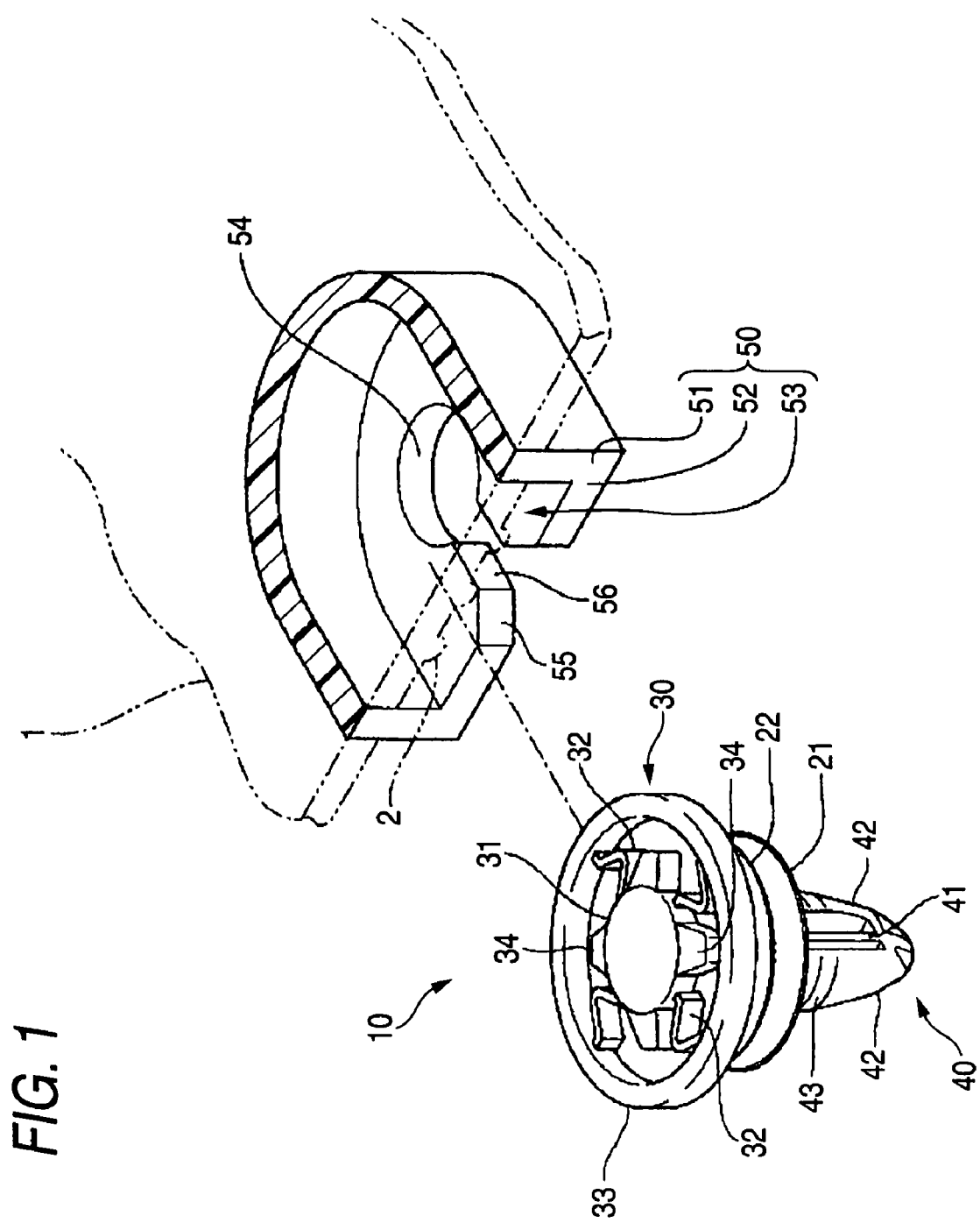
FIG. 1 is a perspective view showing an embodiment of the invention of an interior part mounting clip.
Figure 3:
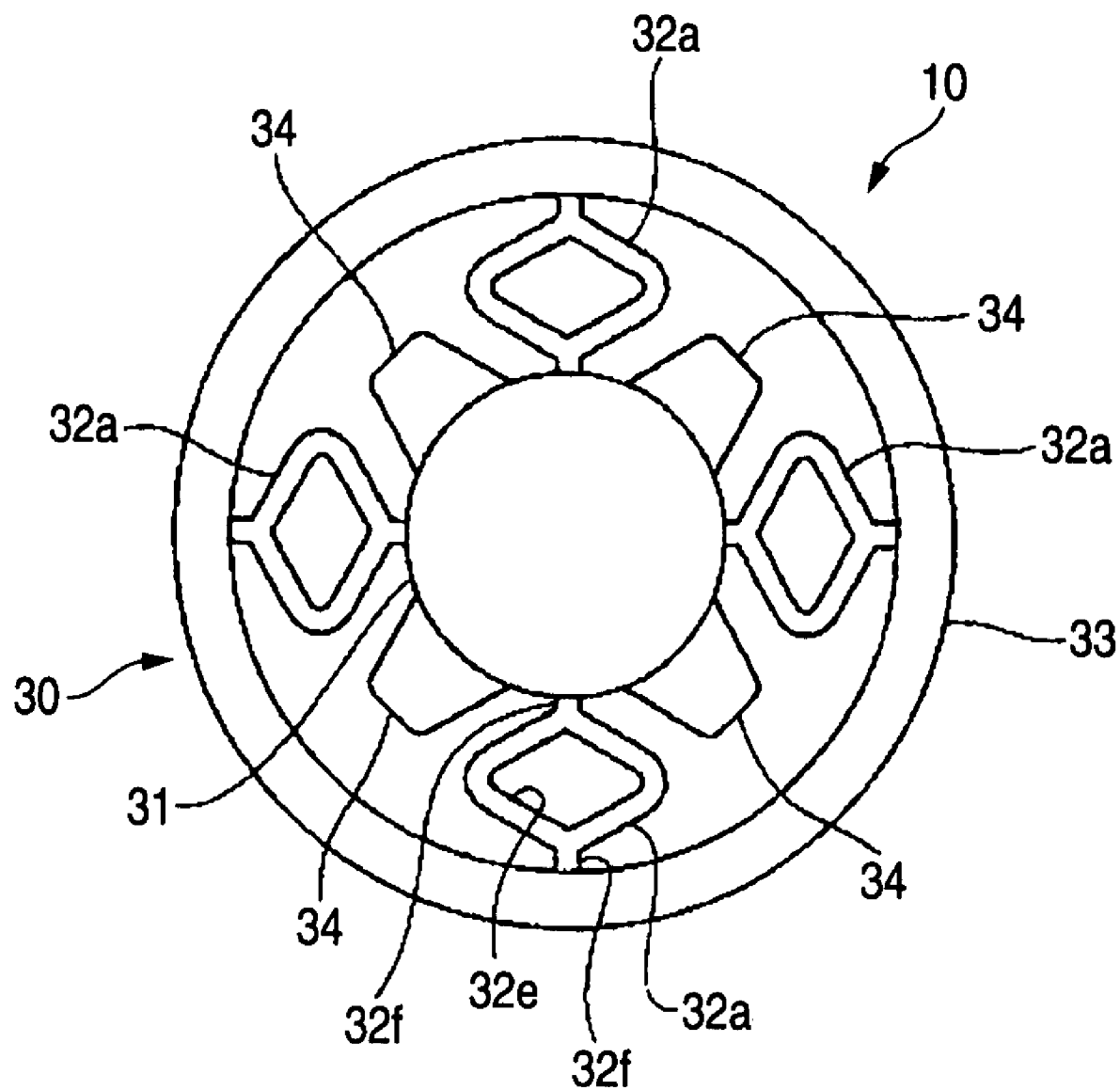
FIG. 3 is atop plan view showing another shape of an elastic portion for the interior part mounting clip of FIG. 1.

As shown in FIG. 1, an interior part mounting clip 10 (as will be called the "clip 10") engages with a frame-shaped mounting seat 50 formed in an interior part 1 such as the door trim of an automobile, to mount the interior part 1 on a panel member 3, as shown in FIG. 3.

The mounting seat 50 includes: a frame-shaped rib 51 erected substantially in a U-shape from the inner side face of the interior part 1; a mounting wall 52 for covering the substantially vertical opening of the interior part 1 of the frame-shaped rib 51; and an opening 53 formed substantially in parallel with the interior part 1.

The frame-shaped rib 51 has an inner circumference formed to have a size substantially fitting the external diameter of an outer frame 33 of a head portion 30 of the clip 10, as will be described hereinafter, and to play a role to hold the outer frame 33 in engagement. The shape of the frame-shaped rib 51 should not be limited to the U-shape but may also be formed into a substantially angular shape, for example, as can be suitably determined according to the shape of the clip 10.

Substantially at the center of the mounting wall 52, there is formed a mounting hole 54, into which the later-described pin portion 20 of the clip 10 is inserted. The mounting hole 54 has an internal diameter A (as referred to FIG. 7) made larger than the external diameter B of the pin portion 20 of the clip 10, so that the pin portion 20 can moved in the mounting hole 54.

At the mounting wall 52, moreover, there are formed a taper portion 55, which is gradually narrowed from the side of the opening 53 toward the mounting hole 54, and an insertion groove 56, which has a predetermined width through the taper portion 55 and communicates with the mounting hole 54. As a result, the pin portion 20 and the head portion 30 of the clip 10 can be inserted from the opening 53 into the inner circumference of the mounting seat 50.

Here, the taper portion 55 plays a role to guide the pin portion 20 for easy insertion. Moreover, the insertion groove 56 has a width E (as referred to FIG. 7) made slightly smaller than the external diameter B of the pin portion 20 of the clip 10 thereby to prevent the pin portion 20 from coming out after inserted into the mounting hole 54.

Figure 5:
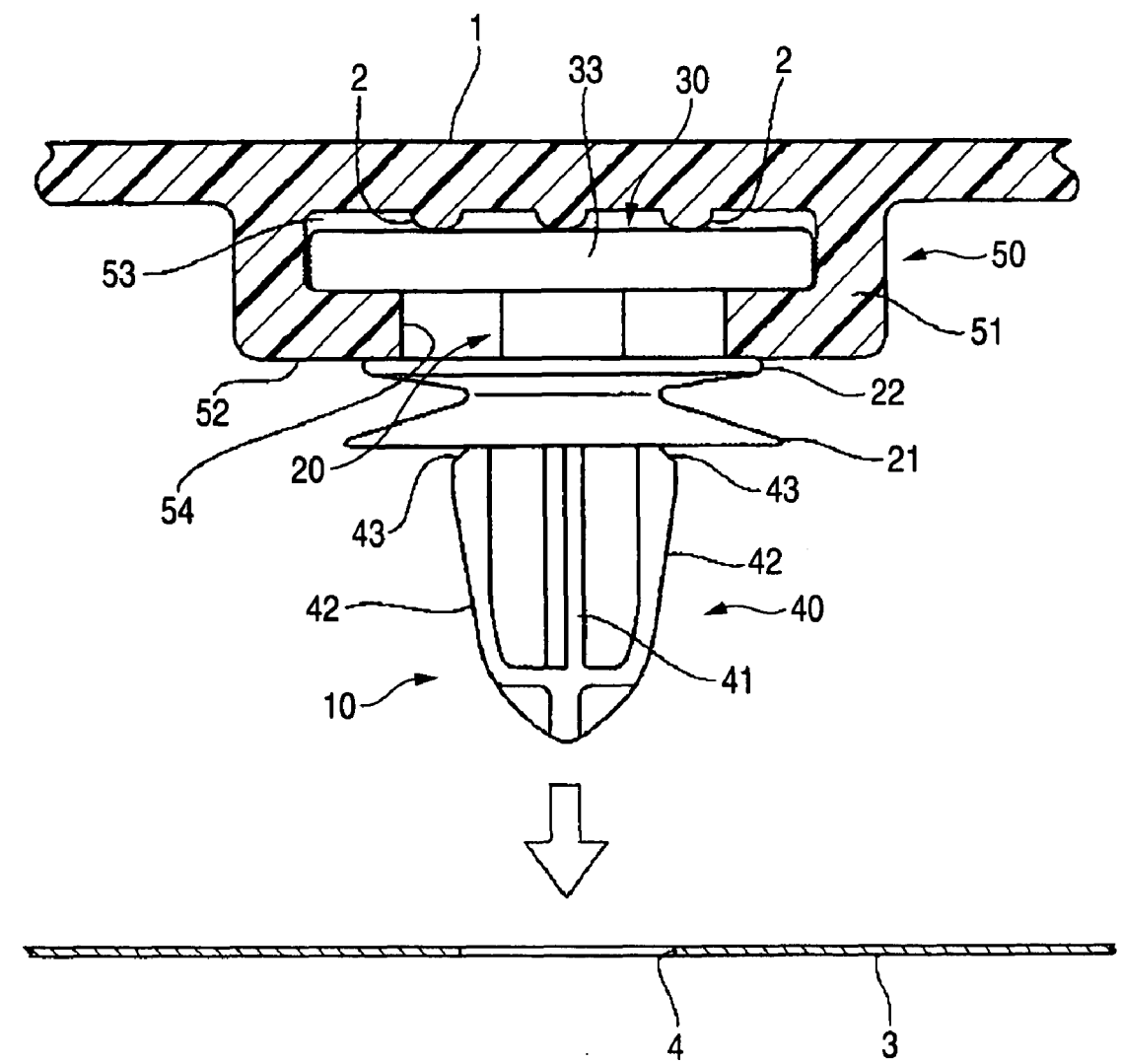
FIG. 5 is an explanatory view showing a first mounting step at the time when an interior part is to be mounted on a panel member by using the interior part mounting clip of FIG. 1.
Figure 6:
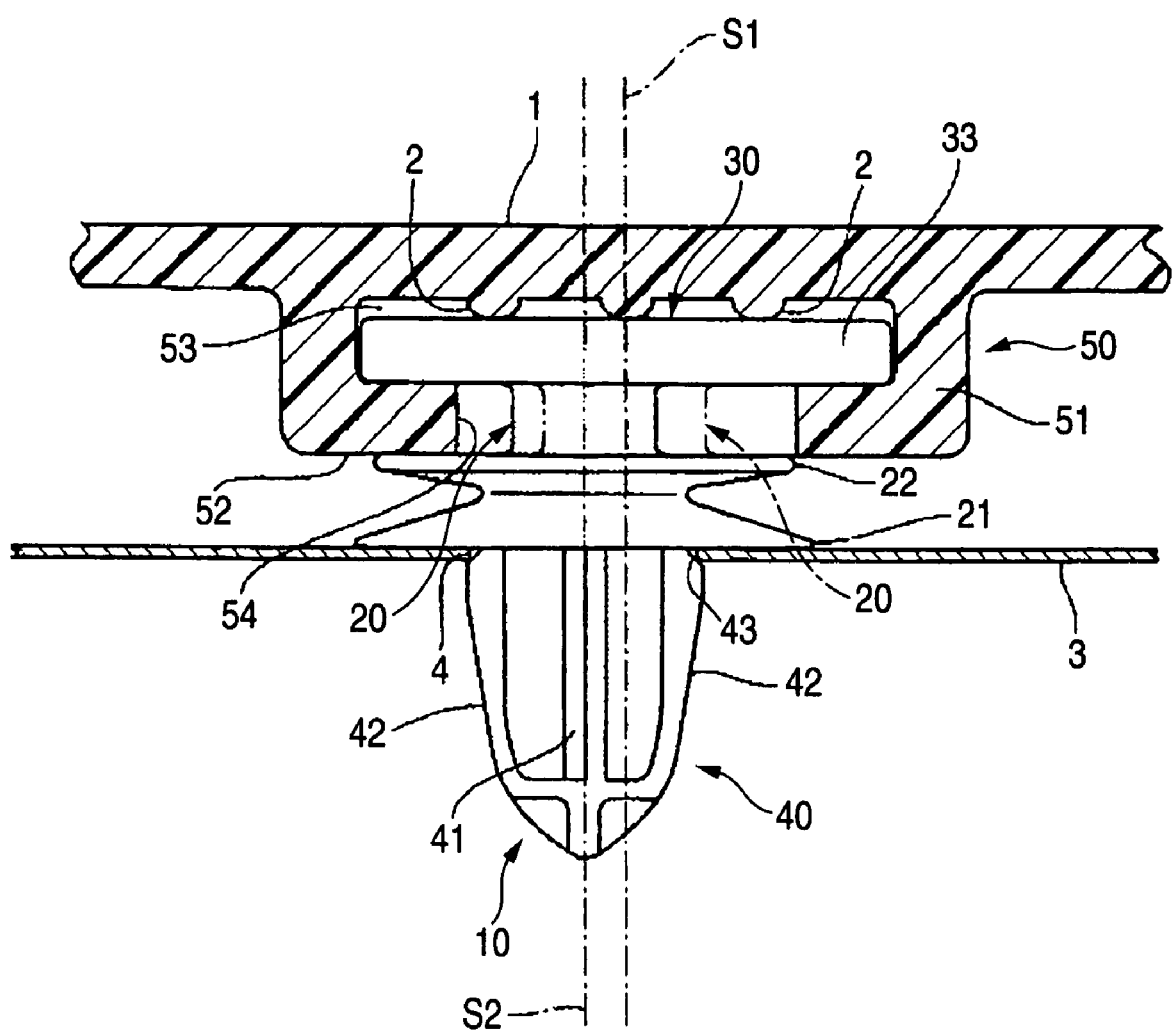
FIG. 6 is an explanatory view showing a second mounting step at the time when an interior part is to be mounted on a panel member by using the interior part mounting clip of FIG. 1.

On the face of the interior part 1, as confronting the mounting wall 52, there are formed a plurality of ridges 2 along the opening 53 of the mounting seat 50 (as referred to FIG. 5 and FIG. 6). The ridges 2 play a role to abut against the head portion 30 of the clip 10 thereby to suppress the rattle in the axial direction.

Figure 2A:
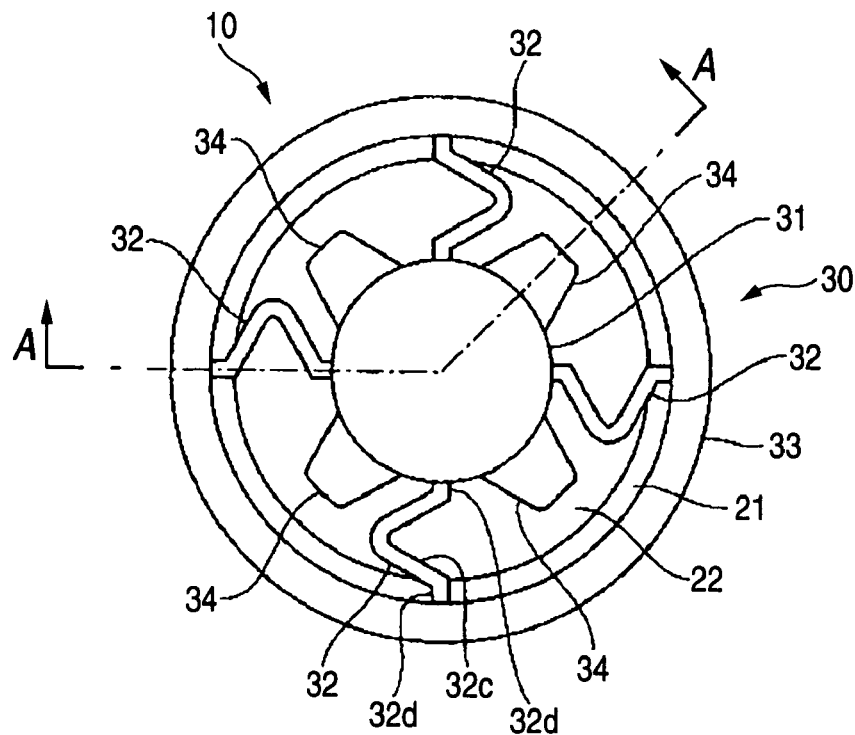
FIG. 2A is a top plan view of the interior part mounting clip of FIG. 1.
Figure 2B:
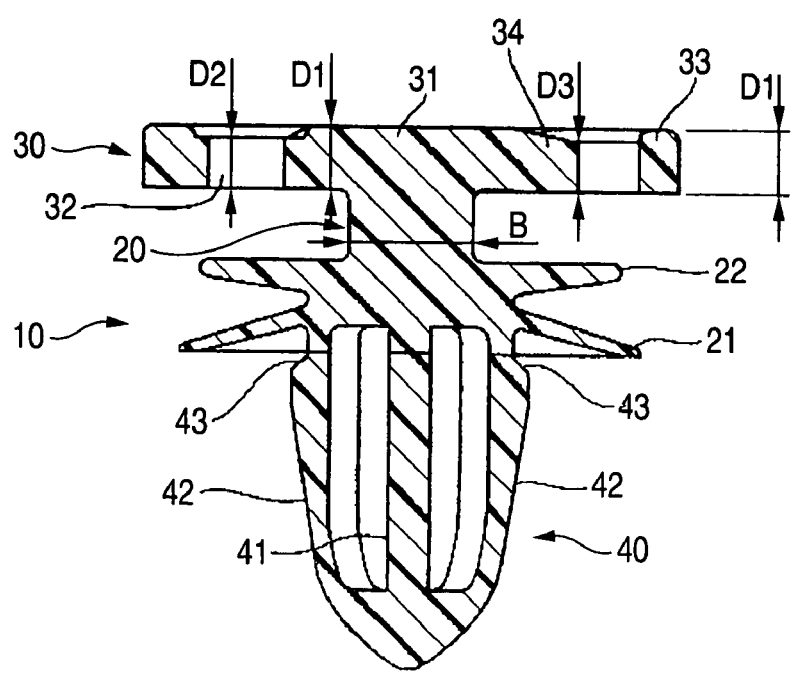
FIG. 2B is a sectional view taken along line A-A of FIG. 2A.

With reference to FIG. 2A and FIG. 2B together, the clip 10 includes: the pin portion 20 substantially having a column shape; the annular head portion 30 formed at one end of the pin portion 20; and a stem portion 40 formed at the other end of the pin portion 20.

The pin portion 20 is so formed to have the external diameter B smaller than the internal diameter A of the mounting hole 54 as can be inserted into the mounting hole 54 of the mounting seat 50 and moved by a predetermined distance in the mounting hole 54. An annular flange portion 22 is formed at a portion spaced by a predetermined distance from the head portion 30 of the pin portion 20. Below the annular flange portion 22, there is formed an elastic flange portion 21, which is diverged in a skirt shape obliquely downward from the pin portion 20. The annular flange portion 22 abuts against the back face of the mounting wall 52 of the mounting seat 50 thereby to suppress the rattle of the head portion 30 and to position the same in the axial direction. On the other hand, the elastic flange portion 21 comes into elastic abutment against the circumferential edge of a later-described engaging hole 4 of the panel member 3 thereby to prevent the rattle of the clip 10.

The head portion 30 includes: a disc-shaped head flange portion 31 bulging to the outer circumference from the circumferential edge of one end portion of the pin portion 20; a plurality of elastic portions 32 bulging radially outward from the head flange portion 31; the annular outer frame 33 formed concentrically of the head flange portion 31 through the elastic portions 32; and protrusions 34 protruding radially outward from between the elastic portions 32 formed at the head flange portion 31.

Figure 4:
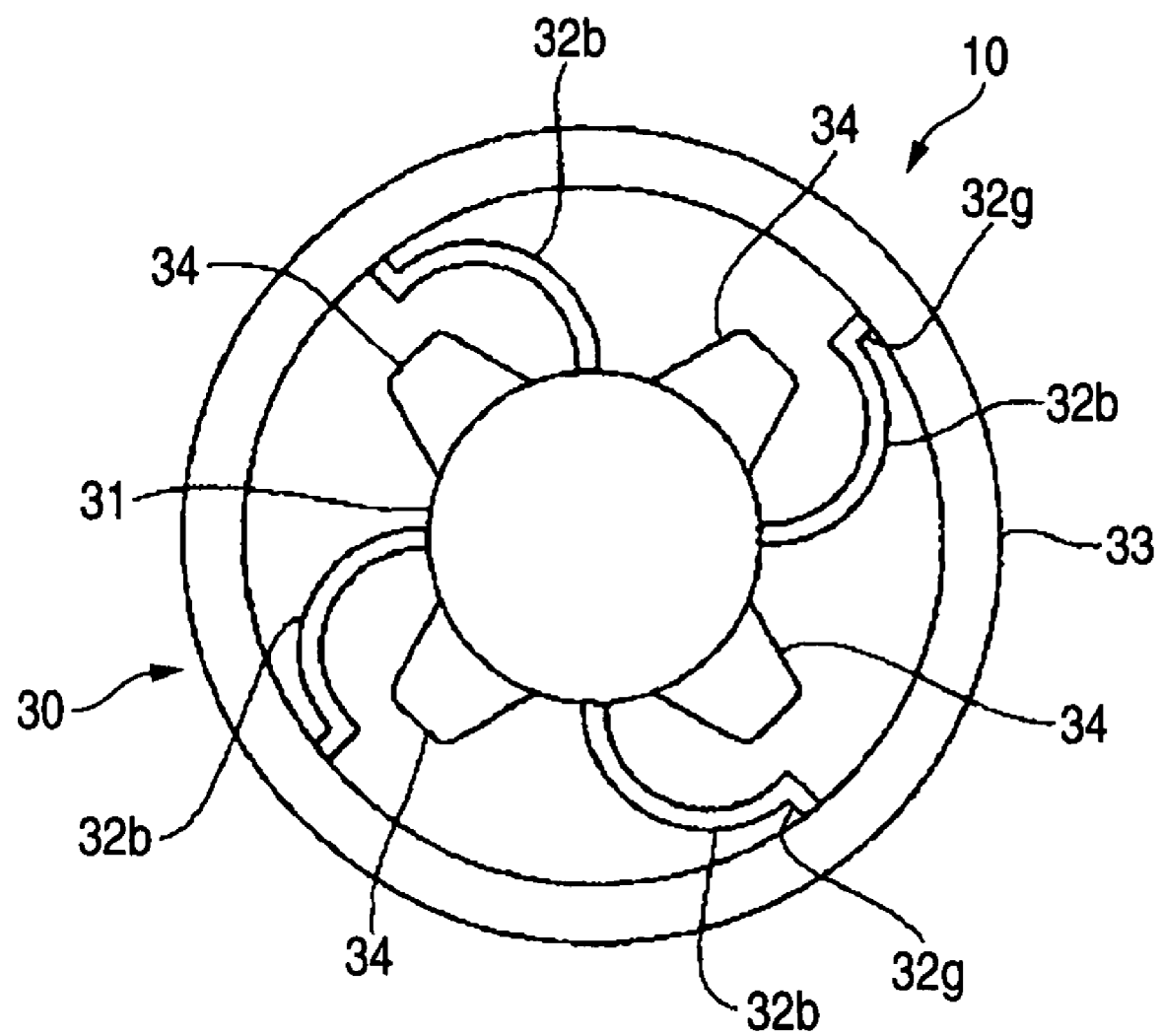
FIG. 4 is atop plan view showing still another shape of an elastic portion for the interior part mounting clip of FIG. 1.

As shown in FIG. 3 and FIG. 4, the head flange portion 31 has its lower face abutting against the inner face of the mounting wall 52 of the mounting seat 50 and its upper face abutting against the ridges 2 formed on the interior part 1. Thus, the head flange portion 31 keeps the pin portion 20 in the position normal to the mounting seat 50, and prevents the rattle or play of the pin portion 20 when the pin portion 20 moves in the mounting hole 54, thereby to move the pin portion 20 in the horizontal direction with respect to the mounting wall 52. Here, the head flange portion 31 has a height D1.

In the case of the embodiment, the elastic portions 32 are formed substantially into a V-shape, as viewed in the axial direction, such that the four elastic portions 32 are extended radially at an equal spacing from the head flange portion 31. More specifically, each of the elastic portions 32 includes a folded portion 32c substantially of a V-shape, and straight portions 32d and 32d folded from the two ends of the folded portion 32c perpendicularly of the circumferential directions of the head flange portion 31 and the outer frame 33. The elastic portion 32 is connected through the straight portions 32d and 32d to the head flange portion 31 and the outer frame 33 so that the pin portion 20 can be radially displaced by the elastic portions 32 when the outer frame 33 is held in the inner circumference of the frame-shaped rib 51 of the mounting seat 50. Thus, the elastic portion 32 is prepared by forming the straight portions 32d and 32d and then the folded portion 32c so that it can be elastically deformed with ease.

Moreover, the elastic portions 32 should not be limited to the V-shape but may also be formed into diamond-shaped elastic portions 32a, as viewed in the axial direction in FIG. 3. Specifically, each of the elastic portions 32a is formed to have a diamond-shaped folded portion 32e, and straight portions 32f and 32f folded from the two ends of the folded portion 32e perpendicularly of the circumferential directions of the head flange portion 31 and the outer frame 33. The head flange portion 31 and the outer frame 33 are connected through the straight portions 32f and 32f so that the elastic portion 32 is also elastically deformed with ease, as described hereinbefore (but with less ease than the elastic portions 32 shown in FIG. 2A and FIG. 2B).

As shown in FIG. 4, moreover, the elastic portions 32 may also be exemplified by elastic portions 32b, which are arcuate, as viewed in the axial direction. In this case, each of the elastic portions 32b connects the head flange portion 31 and the outer frame 33 through its straight portion 32g protruded vertically from the inner circumference of the outer frame 33. Each of the elastic portions 32 may also be exemplified by an S-shape, as viewed in the axial direction, although not shown. Thus, the elastic portions 32 can have their shapes suitably decided according to the purpose. Here, the diamond-shaped elastic portions 32a, as shown in FIG. 3, have an advantage that they are hardly broken to raise the reliability of the clip 10, and the arcuate elastic portions 32b have an advantage that they are elastically deformed with ease to improve the workability.

In the elastic portions 32, a height D2 from the end face to abut against the mounting wall 52 of the mounting seat 50 to the upper face confronting the interior part 1 is lower than the height D1 of the head flange portion 31 and the outer frame 33. As a result, when the head portion 30 is mounted on the mounting seat 50, the elastic portions 32 do not abut against the inner face of the interior part 1.

The outer frame 33 is formed into such an annular shape as to fit the frame-shaped rib 51 of the mounting seat 50, and has its external diameter formed to have a size to fit the frame-shaped rib 51. Moreover, the outer frame 33 is formed to have the same height D1 as that of the head flange portion 31 and held to engage with the mounting seat 50. The head flange portion 31 is made annular in the case of the embodiment, but may also be formed into an angular shape. The annular case has no directivity in the inserting direction with respect to the mounting seat 50 so that it can have an excellent workability, and the angular shape exhibits a rotation stopping effect.

The four protrusions 34 are so formed radially at equal distances between the individual elastic portions 32 as to correspond the four elastic portions 32 formed radially from the head flange portion 31. The protrusions 34 engage with the circumferential edge of the mounting hole 54 thereby to keep the engaging state between the head portion 30 of the clip 10 and the mounting seat 50. The case of the embodiment is provided with the four protrusions 34, which may be provided by at least three. The four protrusions 34 are held on the circumferential edge of the mounting hole 54 in a well-balanced manner by the equivalent engaging forces thereby to smoothen the movement of the pin portion 20.

Moreover, the protrusions 34 are so tapered as are gradually lowered toward the outer circumference from the circumferential edge of the head flange portion 31. If the height of on the side facing the interior part 1 (i.e., the height to the tapered leading end in this case) from the end face to abut against the mounting wall 52 of the mounting seat 50 is designated by D3, this height D3 is made smaller than D1 so that the protrusions 34 do not abut against the inner face of the interior part 1. Here in the embodiment, the protrusions 34 are tapered but may also be stepped, so long as they are so high as not to abut against the inner face of the interior part 1.

Figure 7:
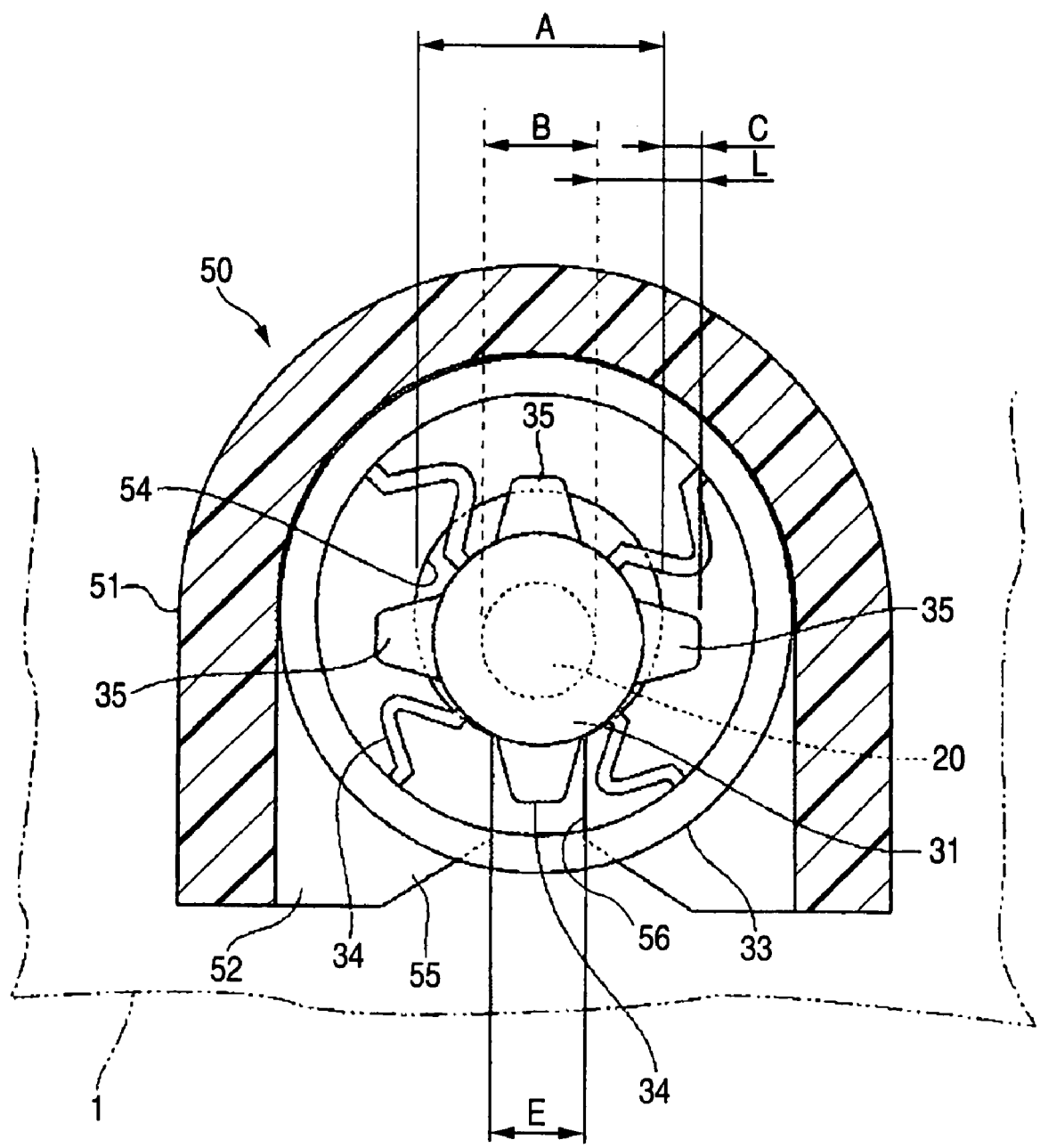
FIG. 7 is an explanatory view showing a first engaging state, in which protrusions of the interior part mounting clip of FIG. 1 engage with a mounting hole.

As shown in FIG. 7, moreover, the protrusions 34 are protruded by a length L (as will be called the protrusion length "L") radially outward from the pin portion 20 so that they engage with the circumferential edge portion of the mounting hole 54. Specifically, the protrusion length L of the protrusions 34 is so set as is expressed by L=A−B+C, if the internal diameter of the mounting hole 54 of the mounting seat 50 is designated by A, if the external diameter of the pin portion 20 is designated by B, and if the length of engaging portions 54, as required for the protrusions 34 to engage with the mounting hole 54, is designated by C.

The stem portion 40 includes a post 41 extending from the end portion, as opposed to the head portion 30, of the pin portion 20, and a pair of leg portions 42 and 42 connected at their root portions to the back of the elastic flange portion 21. On the root ends of the leg portions 42, moreover, there are formed engaging step portions 43, which engage with the circumferential edge of the engaging hole 4 of the panel member 3. Here, the embodiment described above is provided the stem portion 40. This stem portion 40 may have any shape so long as it can engage with the engaging hole 4 of the panel member 3. For example, the engaging portion may also be exemplified by engaging means having the so-called "anchor shape", which includes a post, and a pair of leg portions extending obliquely away from the leading end of the post 41.

Here is described the method for mounting the interior part 1 of the case using the clip 10 of this embodiment.

While the head portion 30 of the clip 10 is being inserted into the frame-shaped rib 51 from the opening 53 of the mounting seat 50 formed in the interior part 1, the pin portion 20 is inserted into the mounting hole 54 through the taper portion 55 and the insertion groove 56. The outer frame 33 of the head portion 30 abuts against the inner face of the frame-shaped rib 51, the protrusions 34 engage with the circumferential edge of the mounting hole 54, and the annular flange portion 22 abut against the back face of the mounting wall 52, so that the clip 10 is mounted on the mounting seat 50, as shown in FIG. 5.

In this state, the stem portion 40 of the clip 10 is inserted in the direction of arrow of FIG. 5 into the engaging hole 4 of the panel member 3 while the leg portions 2 being slightly warped, thereby to bring the engaging step portions 43 into engagement with the circumferential edge of the back of the panel member 3, and the elastic flange portion 21 comes into engagement with the circumferential edge of the surface of the panel member 3, so that the interior part 1 can be mounted on the panel member 3 through the clip 10.

At this time, even if the position of the stem portion 40 of the clip 10 mounted in advance on the interior part 1 is slightly deviated due to a dimensional error or the like from the position of the engaging hole 4 of the panel member 3, the pin portion 20 has the external diameter B smaller than the internal diameter A of the mounting hole 54, so that the stem portion 40 can be inserted into the engaging hole 4 by reducing the elastic portions 32 radially to displace the position of the pin portion 20 with respect to the outer frame 33.

Thus, by the extending/shrinking actions of the elastic portions 32 and by the mutual relations between the external diameter B of the pin portion 20 and the internal diameter A of the mounting hole 54, the pin portion 20 can be moved in the direction of arrow from an axial line S1 at the beginning to an axial line S2. As a result, the interior part 1 can be easily mounted on the panel member 3 while absorbing the positional deviation from the stem portion 40 of the clip 10.

Before the stem portion 40 is inserted into the engaging hole 4, moreover, the pin portion 20 is so held by the elastic portions 32 as is positioned substantially at the center of the outer frame 33 so that the stem portion 40 is held and positioned substantially at the center of the mounting hole 54. As a result, the stem portion 40 can be easily inserted without any large dislocated into the engaging hole 4 of the panel member 3.

Moreover, both the elastically deformable elastic portions 32 and the protrusions 34 to engage with the circumferential edge of the mounting hole 54 are formed to extend radially outward from the head flange portion 31 of the head portion 30, so that they can be given a relatively simple structure and a thin compact shape.

Moreover, the protrusions 34 are extended from between the individual elastic portions 32 formed at the head flange portion 31 so that the protrusions 34 and the elastic portions 32 are arranged to have no interference with each other. As a result, the elastic portions 32 can be made long without being influenced by the arrangement of the protrusions 34 so that they can be easily extended and shrunken. Thus, the insertability of the clip 10 is improved in case the positional deviation is caused by the aforementioned dimensional error or the like.

Moreover, the protrusions 34 are formed by at least three at the head flange portion 31 so that they can make well-balanced engagement with the circumferential edge of the mounting hole 54 of the mounting seat 50, thereby to hold the interior part 1 stably with little rattle and play.

Moreover, the protrusions 34 and the elastic portions 32 are radially protruded through the head flange portion 31 protruded radially outward of the pin portion 20. Even if the pin portion 20 shakes obliquely or rattles vertically, therefore, the head flange portion 31, as made larger than the pin portion 20, abuts against the inner face of the mounting seat 50 so that it can keep the position of the pin portion 20 in the stable state while suppressing the clatter and the play.

Moreover, the height D2 of the elastic portions 32 is smaller than the height D1 of the head flange portion 31 and the outer frame 33. Even if the elastic portions 32 cause large elastic deformations, therefore, they do not abut against the inner face of the interior part 1 but can perform extensions and shrinkages smoothly thereby to displace the pin portion 20 easily.

Moreover, the height D3 of the protrusions 34 is made smaller than the height D1 of the head flange portion 31. As a result, the protrusions 34 do not abut against the inner face of the interior part 1 so that the pin portion 20 can smoothly act when it is displaced with respect to the outer frame 33.

Figure 8:
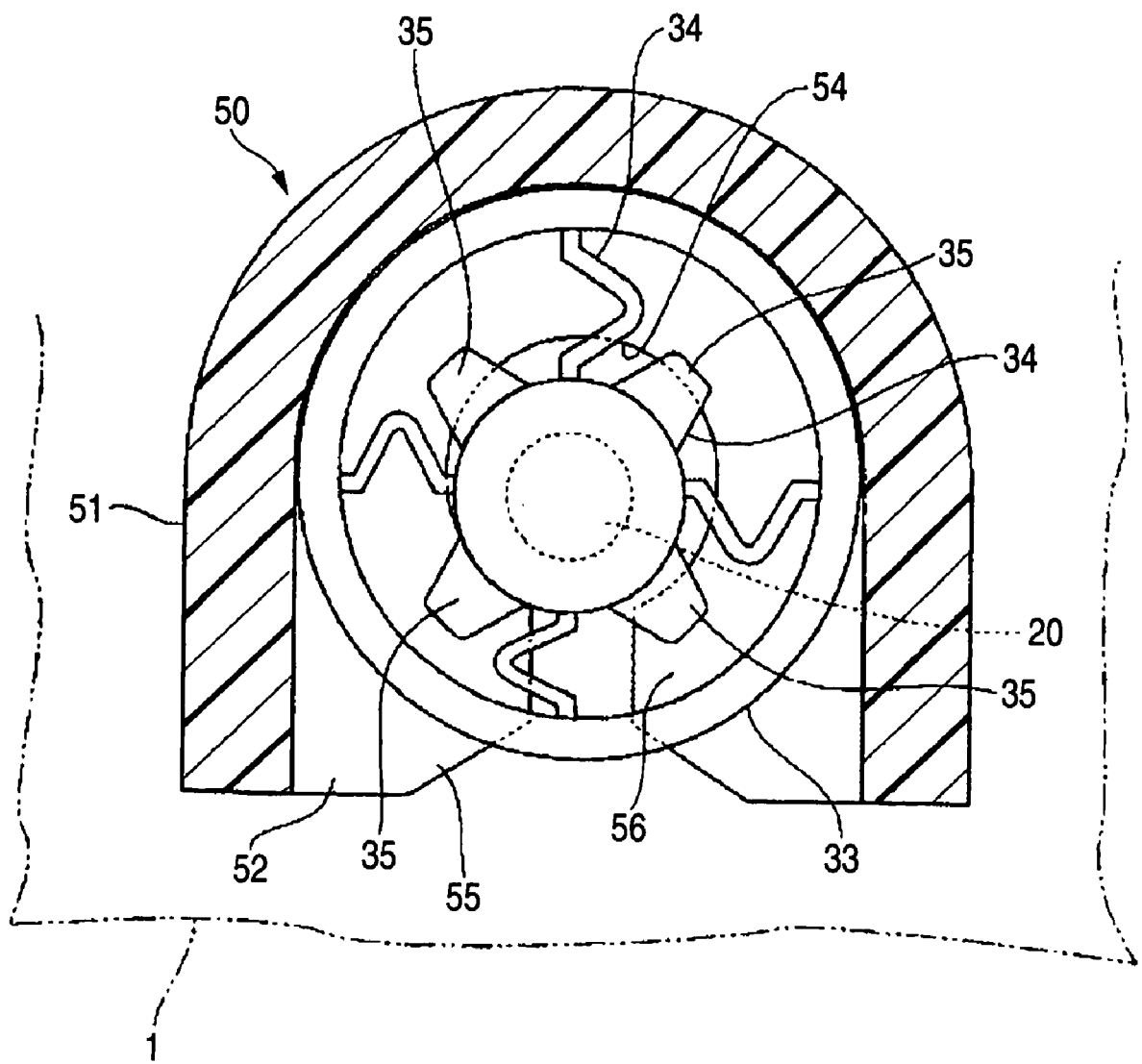
FIG. 8 is an explanatory view showing a first engaging state, in which the protrusions of the interior part mounting clip of FIG. 1 engage with the mounting hole.

As shown in FIG. 7, moreover, the protrusion length L of the protrusions 34 is so set as is expressed by L=A−B+C, if the internal diameter of the mounting hole 54 of the mounting seat 50 is designated by A, if the external diameter of the pin portion 20 is designated by B, and if the length of engaging portions 54, as needed for the protrusions 34 to engage with the mounting hole 54, is designated by C. Even if the pin portion 20 is displaced toward the opening 53, as shown in FIG. 7, the elastic portions 32 of the three protrusions 34 engage with the circumferential edge of the mounting hole 54. In case the pin portion 20 is displaced obliquely with respect to the mounting hole 54, as shown in FIG. 8, the elastic portions 32 of the four protrusions 34 come into engagement with the circumferential edge of the mounting hole 54.

No matter how the pin portion 20 of the clip 10 might act, the protrusions 34 always keep engagement with the circumferential edge of the mounting hole 54 so that the interior part 1 can be stably held on the panel member 3. When it is necessary to remove the interior part 1 from the panel member 3 so that the stem portion 40 is removed from the engaging hole 4 of the panel member 3, the protrusions 34 always keep engagement with the circumferential edge of the mounting hole 54. As a result, the head portion 30 does not come out of the mounting seat 50 thereby to prevent the fallout of the clip 10.

The embodiment can be utilized as the interior part mounting clip for mounting the interior part of the interior of the automobile on the panel member such as a body panel.

According to the interior part mounting clip of this embodiment, the pin portion is inserted into the mounting hole while the head portion being inserted into the inner circumference of the mounting seat. Then, the protrusions come into engagement with the circumferential edge of the mounting hole to mount the clip on the mounting seat. In this state, the stem portion is inserted into engagement with the engaging hole of the panel member so that the interior part can be mounted through the clip on the panel member.

Even if the stem portion of the clip is slightly deviated from the position of the engaging hole of the panel member, the pin portion can be inserted, while being displaced, into the engaging hole by extending and shrinking the elastic portions. Moreover, the elastic portions and the protrusions are extended radially outward from the head flange portion, so that the structure can be simplified and made compact.

According to the embodiment, the clip can be mounted on the mounting seat by inserting the mounting seat of the pin portion into the mounting hole of the mounting seat while inserting the head portion into the inner circumference of the frame-shaped mounting seat formed in the interior part. In this state, the interior part can be mounted on the panel member through the clip by inserting the pin portion of the clip into engagement with the engaging hole of the panel member.

According to the embodiment, moreover, even if the stem portion of the clip mounted in advance on the interior part is slightly deviated by the dimensional error or the like from the position of the engaging hole of the panel member, the position of the pin portion relative to the outer frame can be displaced by extending/shrinking the elastic portions. Moreover, the pin portion has an external diameter smaller than the internal diameter of the mounting hole so that the pin portion can be inserted into the engaging hole by displacing it.

According to the embodiment, moreover, before the stem portion is inserted into the engaging hole, the pin portion is so held by the elastic portions as it positioned substantially at the center of the outer frame. As a result, the stem portion is held substantially at the center position of the mounting hole. Thus, the stem portion is not seriously deviated when it is inserted into the engaging hole of the panel member so that it can be easily inserted into the engaging hole.

According to the embodiment, moreover, both the elastic portions to be elastically displaced and the protrusions to engage with the circumferential edge of the mounting hole are extended radially output from the pin portion of the head portion, so that the structure can be relatively simplified and so that the shape can be made thin and compact. Unlike the aforementioned Patent Document 1, the structure is not complicated, and the thickness is not increased.

According to the embodiment, moreover, the protrusions are extended from between the individual elastic portions formed at the pin portion so that the protrusions and the elastic portions are arranged to have no interference with each other. As a result, the elastic portions can be made long without being influenced by the arrangement of the protrusions so that they can be easily extended and shrunken. Thus, the insertability of the clip is improved in case the positional deviation is caused by the aforementioned dimensional error or the like.

According to the embodiment, even if the pin portion shakes obliquely or rattles vertically, the head flange portion, as made larger than the pin portion, abuts against the inner face of the mounting seat so that it can keep the position of the pin portion in the stable state while suppressing the clatter and the play.

According to the embodiment, the elastic portions do not abut against the inner face of the interior part so that they can perform extensions and shrinkages smoothly thereby to displace the pin portion easily.

According to the embodiment, the protrusions do not abut against the inner face of the interior part so that the pin portion can smoothly act when it is displaced with respect to the outer frame.

According to the embodiment, no matter how the pin portion might act, the protrusions always keep engagement with the circumferential edge of the mounting hole so that the interior part can be stably held on the panel member. When it is necessary to remove the interior part from the panel member so that the stem portion is removed from the engaging hole of the panel member, the protrusions always keep engagement with the circumferential edge of the mounting hole. As a result, the head portion does not come out of the mounting seat thereby to prevent the fallout of the clip.

What is claimed is:

1. An interior part mounting clip for mounting an interior part on a panel member, comprising:
    a pin portion comprising an external diameter which is less than an internal diameter of a mounting hole formed in a frame-shaped mounting seat formed on the interior part, the pin portion being inserted into and movable in the mounting hole of the frame-shaped mounting seat;
    a head portion being formed at one end of the pin portion, the head portion engaging with the mounting seat and including:
    at least three protrusions protruding radially outward of a head flange portion; and
    an outer frame mounted to be elastically displaceable relative to the pin portion through a plurality of elastic portions extending radially outward from at least part of the pin portion which is positioned among the at least three protrusions, an outer circumference of the outer frame abutting against an inner circumference of the frame-shaped mounting seat and engaging with a circumferential edge of the mounting hole; and a stem portion formed at another end of the pin portion and engaging with an engaging hole formed in the panel member, wherein the elastic portions are protruded radially outward from the head flange portion, and wherein an axial height dimension of the elastic portions is less than an axial height dimension of the head flange portion to form a gap between the side of a head flange which faces the interior part and a side of the elastic portions which face the interior part such that the side of the elastic portions which face the interior part will not contact the interior part.

2. The interior part mounting clip according to claim 1, wherein the protrusions of the head portion are protruded radially outward through the head flange portion protruding radially outward of the pin portion.

3. The interior part mounting clip according to claim 2, wherein a height of a side of each elastic portion to face the interior part, when each elastic portion is engaged with the mounting seat, is less than a height of the outer frame.

4. The interior part mounting clip according to claim 2, wherein a height of a side of each protrusion to face the interior part, when each protrusion is engaged with the mounting seat, is less than the height of the head flange portion.

5. The interior part mounting clip according to claim 3, wherein a height of a side of each protrusion to face the interior part, when each protrusion is engaged with the mounting seat, is less than the height of the head flange portion.

6. An interior part mounting clip for mounting an interior part on a panel member, comprising:

a pin portion comprising an external diameter which is less than an internal diameter of a mounting hole formed in a frame-shaped mounting seat formed on the interior part, the pin portion being inserted into and movable in the mounting hole of the frame-shaped mounting seat;

a head portion being formed at one end of the pin portion, the head portion engaging with the mounting seat and including:

at least three protrusions protruding radially outward of the pin portion; and an outer frame mounted to be elastically displaceable relative to the pin portion through a plurality of elastic portions extending radially outward from at least part of the pin portion which is positioned among the at least three protrusions, an outer circumference of the outer frame abutting against an inner circumference of the frame-shaped mounting seat and engaging with a circumferential edge of the mounting hole; and a stem portion formed at another end of the pin portion and engaging with an engaging hole formed in the panel member, wherein a protrusion length of each protrusion radially outward from an outer circumference of the pin portion, when the head portion engages with the mounting seat, is defined by a following expression:

$$L = A - B + C,$$

wherein the internal diameter of the mounting hole of the mounting seat is defined by A, wherein the external diameter of the pin portion is defined by B, and wherein a length of each engaging portion, when each engaging portion engages with the mounting hole, is defined by C.

7. The interior part mounting clip according to claim 2, wherein a protrusion length of each protrusion radially outward from an outer circumference of the pin portion, when the head portion engages with the mounting seat, is defined by a following expression:

$$L = A - B + C,$$

wherein the internal diameter of the mounting hole of the mounting seat is defined by A, wherein the external diameter of the pin portion is defined by B, and wherein a length of each engaging portion, when each engaging portion engages with the mounting hole, is defined by C.

8. The interior part mounting clip according to claim 3, wherein a protrusion length of each protrusion radially outward from an outer circumference of the pin portion, when the head portion engages with the mounting seat, is defined by a following expression:

$$L = A - B + C,$$

wherein the internal diameter of the mounting hole of the mounting seat is defined by A, wherein the external diameter of the pin portion is defined by B, and wherein a length of each engaging portion, when each engaging portion engages with the mounting hole, is defined by C.

9. The interior part mounting clip according to claim 4, wherein a protrusion length of each protrusion radially outward from an outer circumference of the pin portion, when the head portion engages with the mounting seat, is defined by a following expression:

$$L = A - B + C,$$

wherein the internal diameter of the mounting hole of the mounting seat is defined by A, wherein the external diameter of the pin portion is defined by B, and wherein a length of each engaging portion, when each engaging portion engages with the mounting hole, is defined by C.

10. The interior part mounting clip according to claim 1, wherein a height of a side of each elastic portion to face the interior part, when each elastic portion is engaged with the mounting seat, is less than the height of the head flange portion.

* * * * *